(12) United States Patent
Qabazard et al.

(10) Patent No.: US 11,553,015 B2
(45) Date of Patent: Jan. 10, 2023

(54) PROGRESSIVE INSTANTIATION OF WORKSPACES FOR A GROUP-BASED COMMUNICATION SYSTEM

(71) Applicant: Slack Technologies, Inc., San Francisco, CA (US)

(72) Inventors: Natalie Qabazard, Santa Rosa, CA (US); Anuj Nair, Berkeley, CA (US); Tyler Lewis, San Anselmo, CA (US); Drew Schuster, San Francisco, CA (US)

(73) Assignee: Slack Technologies, LLC, San Francisco, CA (US)

( * ) Notice: Subject to any disclaimer, the term of this patent is extended or adjusted under 35 U.S.C. 154(b) by 0 days.

(21) Appl. No.: 17/222,202

(22) Filed: Apr. 5, 2021

(65) Prior Publication Data

US 2022/0321615 A1 Oct. 6, 2022

(51) Int. Cl.
| | | |
|---|---|---|
| *H04L 65/403* | (2022.01) | |
| *G06N 20/00* | (2019.01) | |
| *H04L 67/568* | (2022.01) | |
| *G06Q 10/10* | (2012.01) | |
| *G06Q 10/06* | (2012.01) | |
| *G06Q 50/00* | (2012.01) | |
| *G06N 5/04* | (2006.01) | |

(52) U.S. Cl.
CPC ............ *H04L 65/403* (2013.01); *G06N 5/04* (2013.01); *G06N 20/00* (2019.01); *G06Q 10/06315* (2013.01); *G06Q 10/101* (2013.01); *G06Q 50/01* (2013.01); *H04L 67/568* (2022.05)

(58) Field of Classification Search
None
See application file for complete search history.

(56) References Cited

U.S. PATENT DOCUMENTS

| | | | |
|---|---|---|---|
| 11,019,001 B1* | 5/2021 | Wu | G06Q 50/01 |
| 2012/0023223 A1* | 1/2012 | Branch | G06F 9/4856 |
| | | | 709/224 |
| 2012/0124147 A1* | 5/2012 | Hamlin | G06N 20/00 |
| | | | 709/206 |
| 2018/0188901 A1* | 7/2018 | Shtuchkin | G06Q 10/10 |

(Continued)

OTHER PUBLICATIONS

"Die, Email, Die! A Flickr Cofounder Aims To Cut Us All Some Slack", ReadWriteWeb, LexisNexis, https://advance.lexis.com/api/permalink/33dd79e2-90f5-409d-ae27-5a2c7e86bf31/?context=1000516>. (dated Aug. 14, 2013, 4:15 PM) 2 pages.

(Continued)

*Primary Examiner* — Chris Parry
*Assistant Examiner* — Abderrahmen Chouat
(74) *Attorney, Agent, or Firm* — Erise IP, P.A.

(57) ABSTRACT

Media, methods, and systems are disclosed for progressively instantiating workspaces for a group-based communication system. A request is received to load group-based communication system workspaces and begin receiving real-time events. The workspaces are classified into a plurality of priority and dormant workspaces. The priority workspaces are instantiated, and real-time events associated with the priority workspaces are transmitted to a group-based communication system. Real-time events are detected that trigger instantiation of dormant workspaces, and associated dormant workspaces added to the set of priority workspaces.

20 Claims, 4 Drawing Sheets

(56) References Cited

U.S. PATENT DOCUMENTS

| | | | | |
|---|---|---|---|---|
| 2018/0260366 A1* | 9/2018 | Brasket | ................ | G06F 40/134 |
| 2018/0287982 A1* | 10/2018 | Draeger | ................ | H04L 51/16 |
| 2021/0097596 A1* | 4/2021 | Gaber | ................ | G06Q 30/0631 |

OTHER PUBLICATIONS

"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 13 pages.

Adrienne LaFrance, "The Triumph of Email", Atlantic Online, LexisNexis, https://advance.lexis.com/api/permalink/32d7ddd9-d4c1-4a73-86f7-08ab5842fde6/?context=1000516, (dated Jan. 6, 2016) 5 pages.

David Auberbach, "Re-Animator. How Stewart Butterfield created Flickr and Slack out of the ashes of failed projects" [online][retrieved May 9, 2019]. Retrieved from the Internet: <URL: https://slate.com/business/2014/05/stewart-butterfield-flickr-and-slack-how-he-snatched-victory-from-the-jaws-of-defeat.html>. (dated May 28, 2014, 2:48 PM) 8 pages.

Ernie Smith, "Picking Up The Slack", Tedium, [online][retrieved May 9, 2019]. Retrieved from the Internet: <URL: https://tedium.co/2017/10/17/irc-vs-slack-chat-history/>. (dated Oct. 17, 2017) 13 pages.

Internet Relay Chat, WIKIPEDIA, [online][retrieved May 30, 2019]. Retrieved from the Internet: <URL: https://en.wikipedia.org/wiki/Internet_Relay_Chat>. (dated May 28, 2019) 20 pages.

Jonathan Vanian, "Why these startups think chat apps are the next big thing in workplace collaboration", GIGAOM, LexisNexis, https://advance.lexis.com/api/permalink/e83778c8-09c8-43aa-9ba0-88526283de69/?context=1000516, (dated Aug. 1, 2014, 5:45 PM) 4 pages.

Matsumoto, T. et al., "Chocoa Communicator—A New Communication System Based on Awareness and Text Communications—", FUJITSU Sci. Tech J., 36, 2, (Dec. 2000) 154-161.

Matthew Ingram, "Flickr co-founder launches Slack, an all-in-one messaging tool designed to kill email forever", GIGAOM, LexisNexis, https://advance.lexis.com/api/permalink/0b676b7c-aec3-4560-861e-d030d1dd008c/?context=1000516, (dated Feb. 12, 2014, 7:03 PM), 2 pages.

Michael Carney, "Slack is thriving on a cocktail of whimsy and great timing", Pandodaily, LexisNexis, https://advance.lexis.com/api/permalink/dd2d4ee5-2ddf-4d3a-a1d9-3bcee5e38b74/?context=1000516, (dated Feb. 6, 2015, 2:12 AM) 3 pages.

Mike Issac, "Slack, a Start-Up With an App to Foster Business Collaboration, Is Valued at $1.1 Billion", The New York Times Blogs (BITS), LexisNexis, https://advance.lexis.com/api/permalink/3eb84b34-a8f9-4d7d-9573-89d9598a4963/?context=1000516>. (dated Oct. 31, 2014) 2 pages.

Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.

Rebecca Walberg, "Email biggest office waste of time: survey", National Post, At FP10, LexisNexis, https://advance.lexis.com/api/permalink/96268e3f-26ad-48ac-a98f-6c39804ebded/?context=1000516, (dated Mar. 4, 2014) 2 pages.

Robert Hof, "Stewart Butterfield On How Slack Became A $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 3 pages.

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 27 pages.

* cited by examiner

PROGRESSIVE INSTANTIATION OF WORKSPACES FOR A GROUP-BASED COMMUNICATION SYSTEM

TECHNICAL FIELD

Embodiments of the invention relate to progressively instantiating workspaces for a group-based communication system. More specifically, embodiments of the invention relate to progressively instantiating workspaces in one or more group-based communication system client applications based on predicted need to access a particular workspace.

A user of a group-based communication system may be a member of a multitude of workspaces, each of which includes sets of group-based communication system objects such as channels, users, projects, and/or tasks within an organization or other team-like grouping. Typically, users of a group-based communication system will interact with only one workspace at a time. However, it is beneficial to have information about the users' other workspaces pre-loaded and continually updated in real time so that if a user switches to another workspace, information about the workspace is already pre-fetched and can be immediately displayed to the user. If, when the user switches to a new workspace, nothing is pre-fetched, there will be some delay before the user will start to see and be able to interact with aspects of the workspace. Depending on a number of workspaces and an amount of associated data and real-time updates being received at a given time, at a group-based communication system client, it would not be practical to pre-fetch and keep updated information relating to all of the workspaces to which a particular user has access. What is needed is a mechanism to predict which workspaces should be pre-loaded and which workspaces can be flushed and not updated for a particular user at any point in time.

SUMMARY

Embodiments of the invention address the above-identified problems by providing a mechanism for progressively instantiating workspaces for a group-based communication system based on current and prior usage of the workspaces.

In particular, in a first embodiment, the invention includes one or more non-transitory computer-readable media storing computer-executable instructions that, when executed by a processor, perform a method for progressively instantiating workspaces for a group-based communication system, the method comprising: receiving, at a group-based communication server, via a group-based communication system, a request to load a plurality of workspaces, classifying, based on prior usage criteria, the plurality of workspaces into a plurality of priority workspaces and a plurality of dormant workspaces, wherein the plurality of dormant workspaces are different than the plurality of priority workspaces, instantiating each of the plurality of priority workspaces in the group-based communication system, and transmitting, to the group-based communication system, real-time events associated with the plurality of priority workspaces without transmitting real-time events associated with the plurality of dormant workspaces.

In a second embodiment, the invention includes a method for progressively instantiating workspaces for a group-based communication system, the method comprising: receiving, at a group-based communication server, via a group-based communication system, a request to load a plurality of workspaces, classifying, based on prior usage criteria, the plurality of workspaces into a plurality of priority workspaces and a plurality of dormant workspaces, wherein the plurality of dormant workspaces are different than the plurality of priority workspaces, instantiating each of the plurality of priority workspaces in the group-based communication system, and transmitting, to the group-based communication system, real-time events associated with the plurality of priority workspaces without transmitting real-time events associated with the plurality of dormant workspaces.

In a third embodiment, the invention includes a system comprising at least one processor and at least one non-transitory memory storing computer executable instructions that when executed by the processor cause the system to carry out actions comprising: receiving, at a group-based communication server, via a group-based communication system, a request to load a plurality of workspaces, classifying, based on prior usage criteria, the plurality of workspaces into a plurality of priority workspaces and a plurality of dormant workspaces, wherein the plurality of dormant workspaces are different than the plurality of priority workspaces, instantiating each of the plurality of priority workspaces in the group-based communication system, and transmitting, to the group-based communication system, real-time events associated with the plurality of priority workspaces without transmitting real-time events associated with the plurality of dormant workspaces.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1:
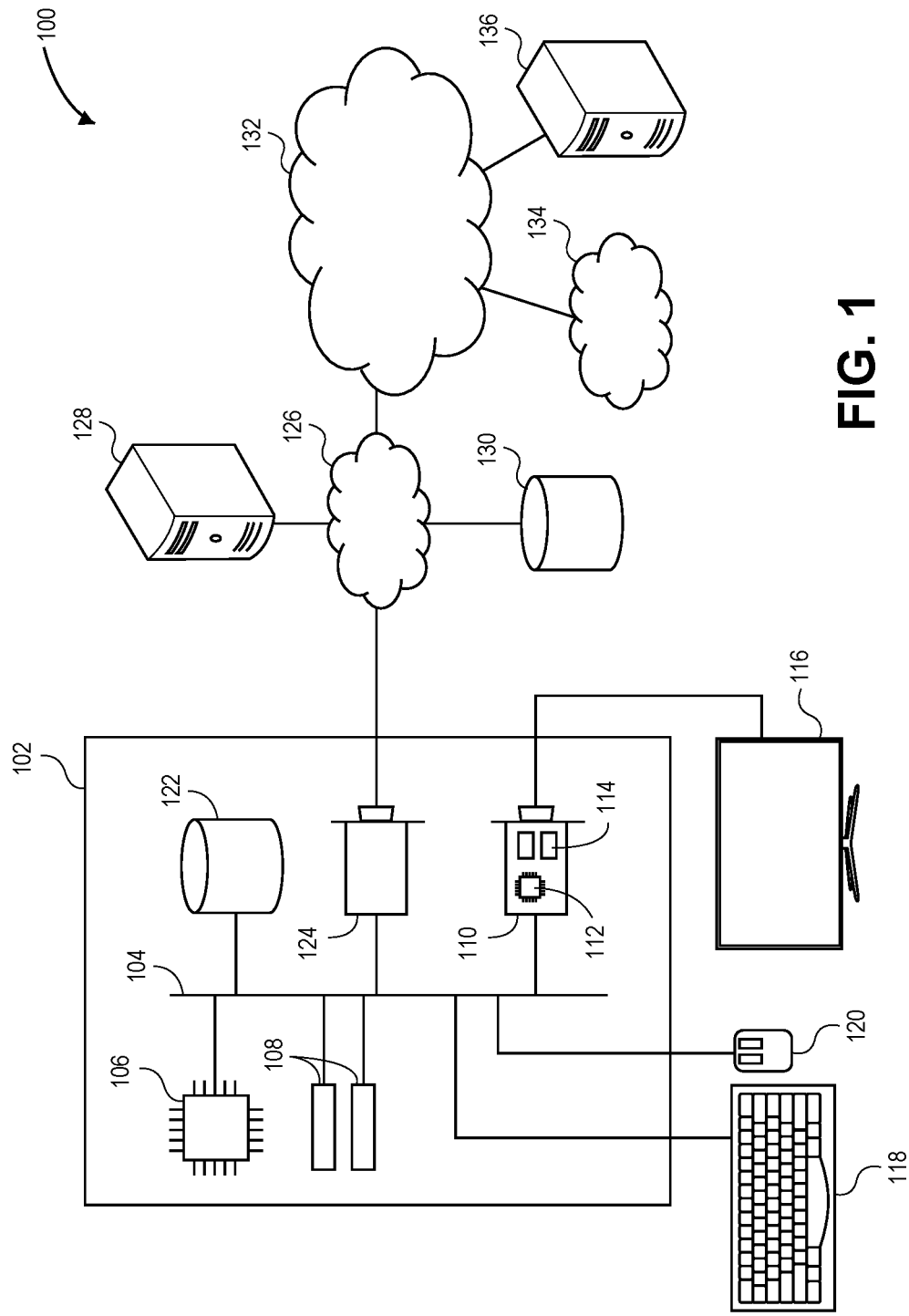
FIG. 1 depicts an exemplary hardware platform for certain embodiments of the invention.

The drawing figures do not limit the invention to the specific embodiments disclosed and described herein. The drawings are not necessarily to scale, emphasis instead being placed upon clearly illustrating the principles of the invention.

DETAILED DESCRIPTION

Context and Concepts of the Invention

As used herein, the term "group-based communication system" refers to a collaborative communication system used within an organization and is distinct from a conventional communication system such as email or group text messaging via SMS or MMS. In some embodiments, the group-based communication system is a channel-based messaging platform. Within the group-based communication system, communication may be organized into "channels," each dedicated to a particular topic or set of users. Channels are generally long-lasting, persistent discussions of a particular topic. Members of a particular channel can post messages within that channel that are visible to other members of that channel together with other messages in that channel. Users may select a channel for viewing in order to see only those messages relevant to the topic of that channel without seeing messages posted in other channels on different topics. For example, a software development company may have different channels for each software product being developed, where developers working on each particular project can converse without bothering (or being bothered by) developers working on other projects. Because the channels are generally persistent and directed to a particular topic or group, users can quickly and easily refer back to previous communications for reference.

Communication data within a group-based communication system may include messages, queries, files (e.g., documents, spreadsheets, computer code, images, video, audio, and/or electronic contact information), mentions, users or user profiles, interactions (e.g., reactions, edits, deletions, and/or prioritizations such as by pinning or starring), tickets, channels, applications integrated into one or more channels, conversations (e.g., groups of messages that have been segmented as single units), workspaces (e.g., sets of channels, users, projects, tasks within an organization that may have their own sets of permissions and that may be organized substantially in line with an organization chart in some instances) or other data generated by or shared between users of the group-based communication system that are associated with an organization's communication data using the group-based communication system. A group-based communication system object may include any instance of communication data within a group-based communication system. Communication data and other content within a group-based communication system is also referred to generally as group-based communication system content.

In some instances, the communication data may comprise data associated with a user (e.g., a user profile), including, but not limited to, a user identifier, one or more communication channel identifiers associated with communication channels to which the user has been granted access, one or more group identifiers for groups (or organizations, teams, entities, or the like) with which the user is associated, an indication of whether the user is an owner or manager of any communication channels, an indication of whether the user has any communication channel restrictions, a plurality of messages, a plurality of emoji, a plurality of conversations, a plurality of conversation topics, an avatar, an email address, a real name (e.g., Austin Author), a username (e.g., austin_a), a password, user preferences and/or settings, a time zone, a status, a token, and other user-specific information. In some embodiments, the group-based communication system may additionally or alternatively store permissions data associated with permissions of individual users of the group-based communication system. In some embodiments, permissions associated with an individual user can be mapped to, or otherwise associated with, an account or profile associated with user data. Permissions can indicate which users can communicate directly with other users, which channels a user is permitted to access, restrictions on individual channels, which workspaces the user is permitted to access, and restrictions on individual workspaces, for example. In some embodiments, the permissions can support the group-based communication system by maintaining security for limiting access to a defined group of users. In some such embodiments, such users can be defined by common access credentials, group identifiers, or other criteria, as described above.

In some embodiments, the group-based communication system can be partitioned into different workspaces, which can be associated with different groups of users. Each workspace can be associated with a group identifier and one or more user identifiers can be mapped to, or otherwise associated with, the group identifier. Users corresponding to such user identifiers may be referred to as "members" of the group. A workspace may comprise one or more channels that are unique to that workspace and/or one or more channels that are shared between one or more workspaces. In some embodiments, workspaces can be associated with one or more organization identifiers, which can be associated with organizations or other entities associated with the group-based communication system. In some embodiments, such data can be mapped to, or otherwise associated with, other types of data (e.g., user data, permission data, or channel data).

The subject matter of the invention is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be understood by one skilled in the art and are intended to be captured within the scope of the claimed invention. Terms should not be interpreted as implying any particular ordering of various steps described unless the order of individual steps is explicitly described.

The following detailed description of embodiments of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of embodiments of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments but is not necessarily included. Thus, the technology can include a variety of combinations and/or integrations of the embodiments described herein.

Operational Environment for Embodiments of the Invention

Turning first to FIG. 1, an exemplary hardware platform for certain embodiments of the invention is depicted. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, via which other components of computer 102 can communicate with each other. In certain embodiments, there may be multiple busses or components may communicate with each other directly. Connected to system bus 104 is central processing unit (CPU) 106. Also attached to system bus 104 are one or more random-access memory (RAM) modules 108. Also attached to system bus 104 is graphics card 110. In some embodiments, graphics card 110 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also, on graphics card 110 is GPU memory 114. Connected (directly or indirectly) to graphics card 110 is display 116 for user interaction. In some embodiments no display is present, while in others it is integrated into computer 102. Similarly, peripherals such as keyboard 118 and mouse 120 are connected to system bus 104. Like display 116, these peripherals may be integrated into computer 102 or absent. Also connected to system bus 104 is local storage 122, which may be any form of computer-readable media and may be internally installed in computer 102 or externally and removably attached.

Computer-readable media include both volatile and non-volatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, Bluetooth, or Wi-Fi (i.e., the Institute of Electrical and Electronics Engineers (IEEE) 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 128, accessible on a local network such as local network 126, or remotely accessible over public Internet 132. Local network 126 is in turn connected to public Internet 132, which connects many networks such as local network 126, remote network 134 or directly attached computers such as computer 136. In some embodiments, computer 102 can itself be directly connected to public Internet 132.

Figure 2:
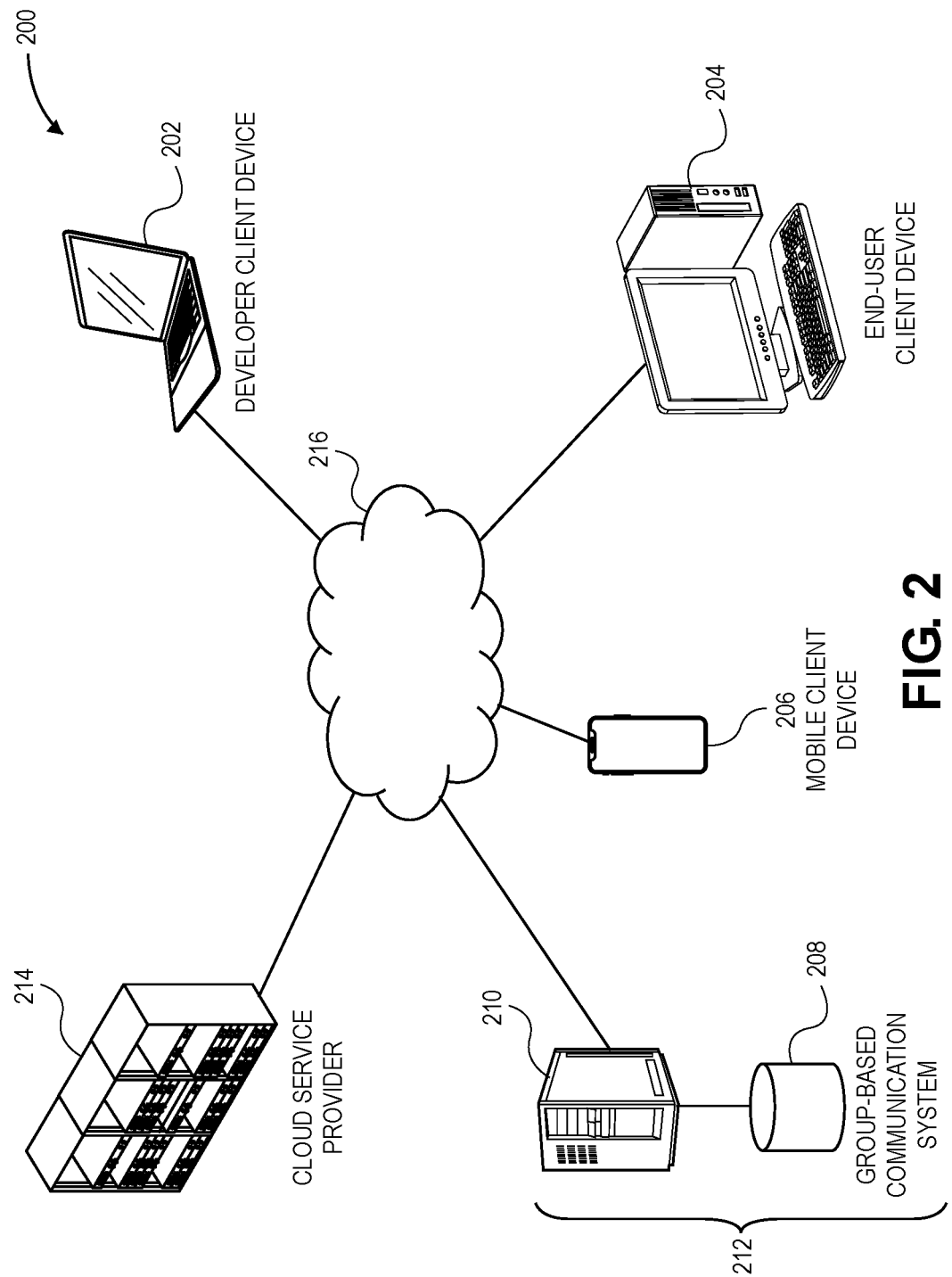
FIG. 2 depicts components of a system for carrying out embodiments of the invention.

Turning now to FIG. 2, an exemplary diagram illustrating components of a system for carrying out embodiments of the invention is depicted and referred to generally by reference numeral 200. System 200 provides a platform for interacting with one or more group-based communication systems. System 200 includes any number of client devices such as group-based communication system client device 204, mobile client device 206, and developer client device 202. An individual user may connect to components of system 200 using a single client device or multiple client devices, either concurrently or sequentially. Similarly, in some embodiments, multiple users may share (concurrently or sequentially) a single client device to access the group-based communication system. As depicted in FIG. 2, client devices may be any form of computing device discussed above with respect to FIG. 1. In particular, a user may access components of system 200 using a desktop, a laptop, or a mobile device. Components of system 200 may be accessible via dedicated software of a particular client device or via a web browser associated with the client device. In some embodiments, developers and application hosting system administrators can access administrative functionality via any client device. In other embodiments, administrative functions can only be accessed from a limited subset of client devices (for example, only via developer client device 202). In some embodiments, group-based communication system 212 is a channel-based messaging platform that can host a multiplicity of group-based communication system servers and group-based communication data stores such as group-based communication system server 210 and group-based communication data store 208.

In some embodiments, group-based communication system 212 provides services in connection with group-based communication system server 210. Group-based communication system server 210 may be a dedicated server, a shared server, a virtual machine instance in a cloud computing environment, or any other form of computing device discussed above with respect to FIG. 1. Although a single group-based communication system server 210 is depicted, embodiments with multiple such group-based communication system servers are also contemplated so as to provide scale, redundancy and/or isolation between different instances of the group-based communication system. For example, a software development company may not wish to have its group-based communications system hosted on the same server as a competitor's group-based communication system for security reasons.

Cloud service provider 214 represents an on-demand cloud computing platform providing data storage and computing resources in the form of dedicated servers, shared servers, virtual machine instances in a cloud computing environment, or any other form of computing device discussed above with respect to FIG. 1. Cloud service provider 214 may provide software as a service (SaaS), infrastructure as a service (IaaS) or platform as a service services (PaaS), including serverless execution in an event-driven serverless execution environment. In some embodiments machine learning computations may be performed in connection with cloud service provider 214 including training of an associated machine learning model.

Group-based communication system server 210 is communicatively coupled to client devices 202, 204, and 206 as well as cloud service provider 214 via network 216. Network 216 may be a local area network (LAN), wide-area network (WAN), virtual private network (VPN) or the Internet. Broadly speaking, any type of network for providing communication between the various components of system 200 is contemplated. Group-based communication system server 210 may provide web server functionality to enable web-based clients and non-web server functionality to enable clients using a dedicated app. Alternatively, both web-based clients and dedicated-app clients might both use a single web server, or the web server might be a gateway providing web-based access to the dedicated-app server. Other techniques for enabling communication among various types of client application are also contemplated.

Group-based communication system data store 208 is communicatively connected to group-based communication system server 210. As depicted, group-based communication system data store 208 is directly connected to group-based communication system server 210; however, any form of communicative connection (for example, network-attached storage (NAS), a network file system (NFS), or cloud-based storage) can be employed. Broadly speaking, group-based communication system data store 208 stores all of the durable information used by group-based communication system server 210. For example, group-based communication system data store 208 may store all of the messages with their associated channels, documents and images uploaded to particular channels, channel membership information, and/or user information. As previously discussed, multiple group-based communication system servers may be present in system 200. In such embodiments, each group-based communication system server may have its own copy of group-based communication system data store 208. Alternatively, multiple group-based communication system servers may share a single network-attached group-based communication system data store. Alternatively, or in addition, in any of these embodiments, data may be sharded across multiple group-based communication system data stores. An overall corpus of group-based communication content contained within one or more group-based communication system data stores is referred to as a group-based communication system repository.

Figure 3:
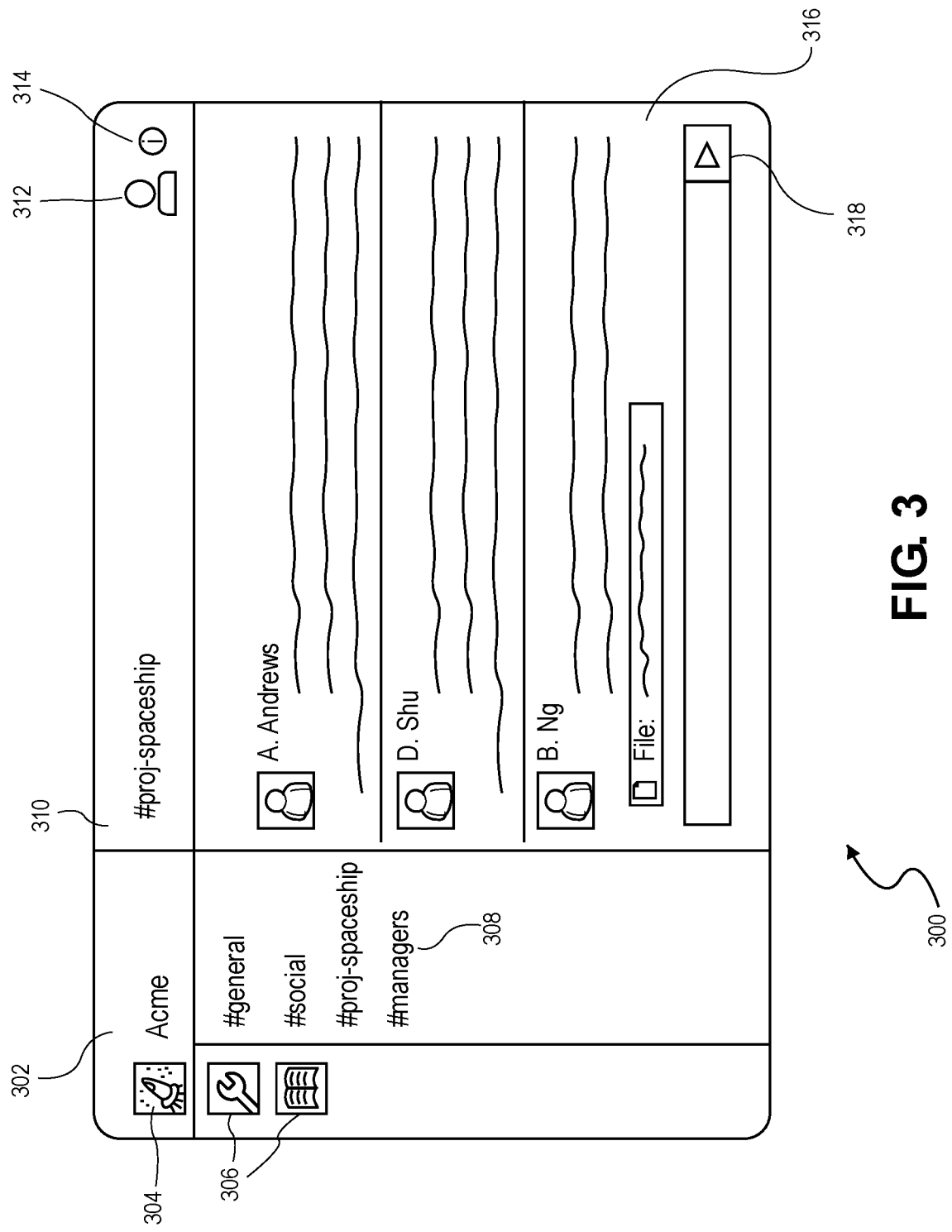
FIG. 3 depicts a group-based communication system client application user interface for carrying out embodiments of the invention.

Turning now to FIG. 3, a group-based communication system client application user interface 300 is depicted for carrying out embodiments of the invention. User interface 300 depicts a group-based communication system client user interface viewing a channel in a group-based communication system for collaboration among a group of users (also known as members of the channel). Users of the group-based communication system can post messages at any point in time, and other members can view them at their leisure, either in real time or when they next visit the particular channel of the group-based communication system. This has the advantage that users can focus on particular tasks without being distracted by the need to constantly monitor real-time communications.

As depicted, user interface 300 includes a navigation pane 302 for navigating the group-based communication system. For example, navigation pane 302 may include a workspace icon 304 with one or more workspace labels to allow the user to switch between different workspaces using the group-based communication system, representing different organizations and/or different teams within an organization. For example, a user may belong to one instance of the group-based communication system associated with their employer and a second instance associated with a volunteer organization to which the user belongs. Within the employer's organization, separate workspaces may exist for teams such as product development and product support. The user may switch to a different workspace by clicking on one of workspace labels 306. Three workspaces are depicted but a user may have access to any number of workspaces, and associated workspaces may be searched for, filtered and/or sorted to enable finding a particular workspace the user wishes to access. Finally, within a workspace, communications may be divided up into channels, with each channel devoted to a particular topic. In some embodiments, user interface 300 includes channel list 308 to which the user has subscribed or to which the user has access, and the user can switch the current channel view to any channel by selecting that channel in the list. In some embodiments, channel list 308 may provide an indication that a particular channel (or channels) contains unread messages or messages that contain updates or updated thread(s) associated with a particular message. Thus, navigation pane 302 allows a user to easily select a channel across different organizations and workspaces. In addition to and optionally below channel list 308 may be presented a list (not shown) of direct message communication channels between one or more users of the group-based communication system. For the purposes of the present disclosure, a direct message communication channel functions analogously to a channel with members individually and manually specified by an initiating user.

User interface 300 also includes channel display 316. Channel display 316 includes information relevant to the user's currently selected channel. For example, channel display 316 may include channel header 310, which displays metadata for the currently selected channel, including channel name, channel membership, and channel topic. Channel header 310 may also include controls 312 and 314 for adding new members to the channel, displaying additional information about the channel, administering the channel, or other channel functions. In some embodiments, controls 312 and 314 may be located elsewhere in channel header 310. In some embodiments, channel display 316 displays the messages posted in the channel by the members of the channel, notifications for the channel, and other channel data. As depicted, channel display 316 shows the most recent messages posted by channel members; however, in some embodiments, messages may be searchable, sortable, and/or scrollable within channel display 316. Finally, channel display 316 may include a message input box 318 allowing users to post messages to the message display for communication to other channel members.

A need to display an arbitrary group-based communication system object (or other group-based communication system content) may arise when interacting with user interface 300. For example, when the user is currently viewing message contents of a particular group-based communication system channel, the user may choose to switch channels by simply clicking on or otherwise selecting a different group-based communication system channel. In this case, all of the messages that will fit within the currently displayed window will need to be accessed in order to display the messages. If the messages are currently present in a client-side cache associated with user interface 300, the messages can be readily displayed by user interface 300. On the other hand, if the messages that need to be displayed are not cached, a request will need to be made to a corresponding group-based communication system to retrieve, from an associated group-based communication system repository, the necessary objects, including the group-based communication system messages in the associated group-based communication system channel.

To the extent possible, it would be advantageous to cache an entire corpus of group-based communication system content to which a user has permissions. Similarly, as new group-based communication system objects are created in the group-based communication system, such new objects can advantageously be sent, for example, by way of real-time events to the group-based communication system client and cached at the client. Similarly, if any change is made in the group-based communication system back-end, such as if an existing message is edited or a user renamed, it is advantageous for a real-time event to be sent to the group-based communication system client application so that the client cache may be correspondingly updated. The benefit of having a full user-accessible corpus of group-based communication system content in cache is that regardless of what a user wants to access by switching channels, switching workspaces, or searching for any group-based communication system object that the user has access to, such content will be readily available in the client-side cache. Moreover, in the case of launching a group-based communication system client application that has been closed with previously cached content, initialization of content display will execute much faster than if content had not been cached and, therefore, had to be retrieved and completely re-initialized at launch.

At some point, however, the volume of group-based communication system content becomes too large to be cached at the client in its entirety. Moreover, in some cases, the volume of incoming real-time messages becomes so high as to exceed an ability of the client application to timely handle all associated incoming events without introducing disruptive delays into the interactive user experience. In many real-world use cases, it is not possible to store all group-based communication system objects and to process in actual real-time all real-time events associated with all of the workspaces, channels, and users that a particular user has access to. As the client cache begins to grow past a certain size, an associated cache data store may consume too much memory or processor resources, which may result in unacceptable interactive response time or even in a crash of the client application. Even if a client application can maintain acceptable interactive response times with a vast amount of cached data, it is inefficient for performance to unnecessarily maintain unneeded cache content having a huge memory footprint as the associated inefficiency may contribute to future performance problems issues.

Instantiating a group-based communication system workspace involves requesting and receiving content associated with the workspace. In some embodiments, to minimize the amount of data necessary to cache and to limit the number of real-time events that it is necessary to process, only a limited number of group-based communication system workspaces are instantiated at any given time. In order to determine which workspaces to instantiate, machine learning methods may be applied to predict which workspaces will be needed by a particular user. Similarly, it is desirable to determine which real-time events should be pushed from the group-based communication system out to a particular client application. For example, a workspace may be partially instantiated in the sense that while less than all (or none) of the group-based communication system content associated with a particular workspace may be transmitted to a client and cached, certain real-time events associated with the workspace may be transmitted to the client. In some embodiments, these real-time events may cause the client to predict that it should fully instantiate or load the workspace. In some other embodiments, where a client predicts that such real-time events are not needed, the client may simply discard the events and not consume resources processing them.

In some embodiments, user interface performance metrics, such as channel switch latency, may be used to determine how many workspaces to instantiate. In some embodiments, such performance metrics are transmitted to a back-end system, and in some other embodiments, the client maintains statistics regarding the performance metrics and determines at the client side whether to load or evict data associated with a particular workspace. By way of illustration, a measure of channel switch latency is calculated from a point in time when a user of the group-based communication system client interface selects a new channel from channel list 308 until user interface 300 is completely refreshed with new channel contents fully rendered within channel display 316. A measure of interactive keystroke latency is calculated from a time that a user of the group-based communication system client interface inputs a keystroke with message input box 318 in focus until which time a corresponding character is rendered within message input box 318. Another measure of user experience latency is an amount of time before a hover box is displayed when, for example, a user causes a cursor to hover over a channel name. This may occur, for example, in embodiments where hovering over a channel name in channel list 308 may provide additional information regarding the channel. Any such performance metric may be used to determine a number of workspaces that can be instantiated without negatively impacting user experience.

Figure 4:
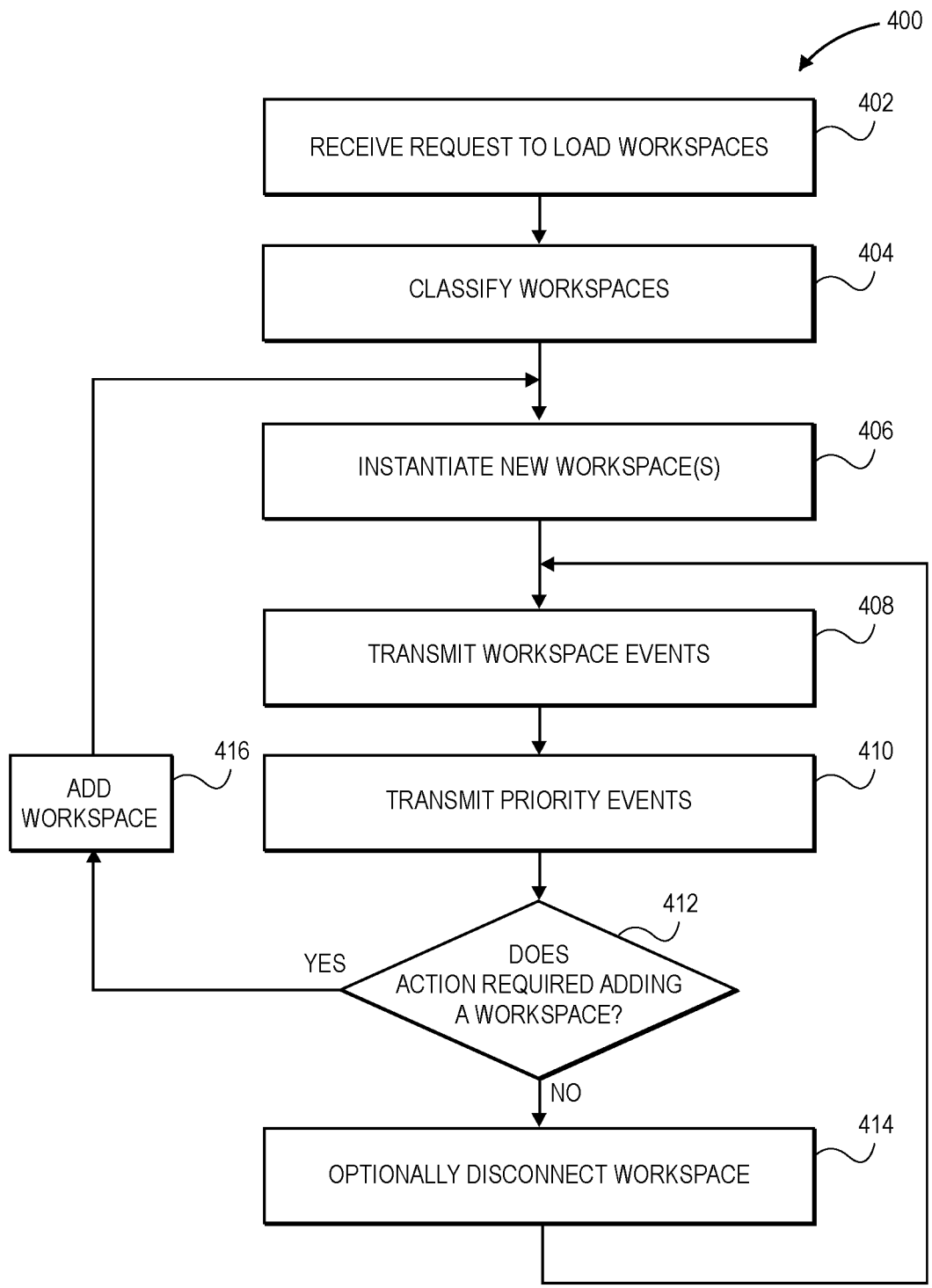
FIG. 4 depicts an exemplary flow chart for illustrating the operation of a method in accordance with various embodiments of the invention.

Turning now to FIG. 4, an exemplary flowchart for illustrating the operation of a method in accordance with various embodiments of the invention is depicted and referred to generally by reference numeral 400. In some embodiments, back-end group-based communication systems continually receive a multitude of statistics regarding the use of group-based communication system clients. In some embodiments, such statistics relate to computational or memory resources consumed within corresponding client devices as well as a number of organizations and/or workspaces to which a particular client application is connected, a number of channels within each workspace the particular user has access to, a number of messages in each channel, and an overall size associated with the content of the messages and other group-based communication system objects in each of the channels to which the user has access. In addition, statistics regarding: (i) rates of real-time events received at various client applications; and (ii) sizes, over time, of client-side caches as the group-based communication system clients execute and interact with the group-based communication system. Statistics regarding degraded user experience events are also received at the group-based communication system, such as when client interactive response times exceed a predetermined threshold or when a group-based communication system client crashes, as determined by the group-based communication system client ceasing to respond to real-time events or otherwise to communicate with the group-based communication system. This collected information may be used to train machine learning models for carrying out embodiments of the invention. Alternatively, or in addition, data may be collected, and machine-learning models trained, entirely at the client device.

At step 402, a request is received to load certain group-based communication system workspaces. In some embodiments, any request to load content associated with a workspace is interpreted as a request to instantiate and begin receiving real-time events for that workspace. In some other embodiments, a specific set of requests may be provided by a group-based communication system client application for a specific set of workspaces. In some other embodiments, a group-based communication system client application requests a set of workspaces predicted to be most relevant to a particular user of a group-based communication system.

At step 404, workspaces are classified for a particular user in connection with the user's access of a group-based communication system. In some embodiments, classification of workspaces is carried out based on machine-learning models incorporating particular criteria associated with aspects of workspace content such as prior usage of the workspace. Prior usage may involve authorship of group-based communication system messages, reading such messages, creating channels or the like. In some embodiments, a set of group-based communication system workspaces is classified into top-ranked workspaces that are currently in use by a user or likely to be used soon. In these embodiments, the remainder of the workspaces are classified as dormant. Dormant workspaces are not currently in use and predicted not to be needed in the immediate future.

At step 406, each of the plurality of top-ranked or priority group-based communication system workspaces are instantiated. Instantiation may be considered a process of: (i) caching all or a significant portion of workspace content at a group-based communication system client; (ii) subscribing to real-time events associated with the workspace; and (iii) subsequently processing the real-time events. In some embodiments, a distinction may be made between various levels or degrees of instantiation. In some embodiments, a particular workspace may be considered "fully instantiated" if substantially all of the content associated with the workspace is transmitted to and cached by a group-based communication system client application and all of the associated real-time events are similarly received and processed by the client application. On the other hand, a workspace may be considered partially instantiated if only a portion of the content associated with the workspace is transmitted to and cached by a group-based communication system client application and/or only a portion of the associated real-time events are received and processed by the client application. A dormant workspace may be considered dormant if little or no content associated with the workspace is transmitted to and cached by a group-based communication system client application and/or few or no associated real-time events (for example, only priority events, as described below) are received and processed by the client application.

At step 408, workspace events are transferred to a group-based communication system client. In some embodiments, such workspace events are real-time events associated with the top-ranked workspaces. In these embodiments, real-time events for the dormant workspaces are not transmitted. Such workspace events may correspond to any update to an instantiated workspace such as a newly created or updated channel, a new or updated user in the workspace, a new or edited message in one or more of the channels, a mention of the user associated with the client in the workspace, or a direct message (or multi-party direct message) intended for the user of the client. A benefit of timely reception of real-time workspace events is that content associated with a workspace is updated substantially contemporaneously with an action in the group-based communication back end, and messages are received substantially when they are sent. In this sense, real-time relates to user perception. In various embodiments, sub-second response times are considered to provide a real-time user experience. For example, if when a message is posted by one user to a group-based communication system channel, a corresponding event is received at other users' client applications within about one second, such a user experience will typically be perceived as occurring in real time.

At step 410, in some embodiments, priority events are transmitted to dormant workspaces. In these embodiments, priority events comprise a small fraction of the overall number of workspace events that may be generated at a group-based communication system. Because of the relatively lower number of priority events, it is generally possible to transmit all priority events to all workspaces to which a user has access. In some embodiments, a priority event is an event corresponding to a message directed to a user (or a channel) that would result in a notification to the user or members of the channel. In some such events such a notification is a desktop notification that causes an ephemeral pop-up-type user interface component to be displayed to the user. In some other embodiments, a notification is represented by a highlighted channel name of one or more channels to which a new or otherwise updated message has been delivered.

Alternatively, or in addition, a notification may be indicated by way of icon badges or other indicia of new or updated information. In embodiments on mobile-type devices a notification may be a mobile-type notification. In some embodiments, a priority event may be configured to trigger a new instantiation of a workspace for which a priority event is generated. In these embodiments, a triggering real-time event may be detected at a group-based communication system. Examples of triggering events are any of the notifications described above or other events for which it may be predicted that a particular workspace may soon be needed by a particular user of a group-based communication system.

Machine learning mechanisms employ algorithms and statistical models to analyze and identify patterns in data and draw inferences from the identified patterns. The associated statistical models may be referred to as machine learning models. Machine learning models may be trained on existing data sets in order to make predictions regarding new and different sets of data by on identifying patterns in the new and different sets of data. In some embodiments, machine learning algorithms are implemented with group-based communication system domain-specific knowledge regarding types of content to emphasize when training the machine learning models to optimize the machine-learning-model training process. For example, a machine learning algorithm associated with embodiments of the present invention may be programmed to detect counts and frequency of references to a user of a group-based communication system within a particular workspace. By training an associated machine learning model with a large dataset of actual past interactions by similar users of a similar group-based communication system, the machine learning model can predict based on subsequent incoming data whether a certain overall number of mentions or recent frequency of mentions indicate that the user is likely to imminently need access to the workspace. Similarly, more generalized machine learning models can be trained using methods of parameter classification, such as linear classifiers, to detect patterns in arbitrary selections of parameters to predict outcomes of interest in connection with subsequent incoming data.

Because instantiating a workspace may take a user-perceptibly significant amount of time, a user may encounter a suboptimal user experience if the user attempts to access content in a not-yet instantiated workspace. To address this situation, machine learning mechanisms are employed to train machine learning models to predict patterns of events that result in a statistically significant prediction that a workspace should be instantiated (at least to a certain level of instantiation). Accordingly, at test 412, it is determined whether a particular action requires adding a workspace. Adding a particular workspace (step 416) involves adding the workspace to the list of top-ranked workspaces and removing the workspace from the list of dormant workspaces. Returning back to step 406, added workspaces may be fully or partially instantiated. For example, users may predictably access a certain channel first thing in the morning upon activating their group-based communication system client application. An appropriately trained machine learning model is employed to predict that the user will need access to the workspace(s) containing the channels that the user has repeatedly used first thing in the morning. Similarly, if a number of other users with whom a particular user regularly interacts begin to generate activity in a particular workspace, exemplary machine learning models may predict that the particular user will soon need the workspace and can at least partially instantiate that workspace. In some embodiments, the partial instantiation would be relative to the channel or channels in which triggering activity is detected. Triggering activity may be the type of activity that enables the prediction that the workspace will be needed, such as message activity from users with which the particular user regularly interacts. By way of another example, machine learning models may predict that reception of a message referring to content in a particular dormant workspace should cause the particular dormant workspace to be added and at least partially instantiated. By way of yet another example, machine learning models may predict a mention of the user in a particular dormant workspace should cause the particular dormant workspace to be added and at least partially instantiated.

In some embodiments, a type of device on which a group-based communication client application is executing may be of relevance to the degree of instantiation of a particular workspace or to the number of workspaces to be initiated. In these embodiments, mobile clients with limited-bandwidth connections, limited memory for caching, and/or limited battery life may strategically instantiate a limited number of workspaces and those workspaces that are instantiated may only be instantiated to a limited degree. Similarly, devices with limited resources may unload or evict workspaces more readily that devices having the benefit of more substantial available resources.

In some embodiments, events occurring at a particular group-based communication system client application constitute triggering events that cause a workspace to be added. Some of these embodiments involve user interface events occurring in connection with the client application user interface. For example, machine learning models may predict that mouse cursor movement moving towards an icon associated with a particular workspace should cause that particular workspace to be added and at least partially instantiated. By way of another example, filtering and sorting of workspaces may result in a machine learning prediction that a particular set of workspaces should be added and at least partially instantiated.

On the other hand, if no triggering events are identified at test 412, execution continues to step 414 where one or more workspaces may be optionally disconnected or uninstantiated. In some embodiments, disconnecting or uninstantiating a workspace entails flushing a cache in a group-based communication system client application associated with the workspace and unsubscribing to real-time events associated with that workspace. In some embodiments, if a user of a group-based communication system client application has not accessed a workspace or any content associated with the workspace for a predetermined time threshold, the workspace may be partially or fully uninstantiated. In these embodiments cached data associated with the disconnected workspaces may be flushed. Various cache eviction strategies may be employed such as least recently used or least frequently used. In these embodiments, the workspace is removed from the list of top-ranked workspaces and added to the list of dormant workspaces. In some embodiments, workspaces are disconnected or uninstantiated only when a predetermined client application resource threshold is exceeded, for example cache size or processor utilization percentage. Finally, execution proceeds back to 408, at which point workspace events continue to be transmitted.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims. Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. One or more non-transitory computer-readable media storing computer-executable instructions that, when executed by a processor, perform a method for progressively instantiating workspaces for a group-based communication system, the method comprising:

receiving, at a group-based communication server, via the group-based communication system, a request to load a plurality of workspaces, each workspace of the plurality of workspaces comprising one or more group-based communication channels and a plurality of associated content;

classifying, based on prior usage criteria, the plurality of workspaces into a plurality of priority workspaces and a plurality of dormant workspaces, wherein the plurality of dormant workspaces are different than the plurality of priority workspaces;

instantiating each of the plurality of priority workspaces in the group-based communication system;

transmitting, to the group-based communication system, real-time events associated with the plurality of priority workspaces without transmitting real-time events associated with the plurality of dormant workspaces;

determining, based on a machine learning model, that a first dormant workspace of the plurality of dormant workspaces will be a priority workspace; and in response to the determining:
  instantiating the first dormant workspace; and
  adding the first dormant workspace to the plurality of priority workspaces and removing the first dormant workspace from the plurality of dormant workspaces, such that real-time events associated with the first dormant workspace are transmitted to the group-based communication system.

2. The non-transitory computer-readable media of claim 1, the method further comprising:
detecting at the group-based communication server, a triggering real-time event associated with a triggered workspace of the plurality of dormant workspaces; and
in response to the detecting at the group-based communication server:
instantiating the triggered workspace; and
adding the triggered workspace to the plurality of priority workspaces and removing the triggered workspace from the plurality of dormant workspaces, such that real-time events associated with the triggered workspace are transmitted to the group-based communication system.

3. The non-transitory computer-readable media of claim 2, wherein the triggering real-time event comprises a message that mentions a group-based communication system user associated with the triggered workspace.

4. The non-transitory computer-readable media of claim 2, wherein the triggering real-time event comprises an advance triggering prediction based on the machine learning model and recent workspace activity associated with the triggered workspace.

5. The non-transitory computer-readable media of claim 4, wherein the determining is associated with a user interaction with a triggering event.

6. The non-transitory computer-readable media of claim 1, wherein the method further comprises:
monitoring workspace inactivity associated with each priority workspace of the plurality of priority workspaces to identify one or more inactive workspaces; and
in response to identifying the one or more inactive workspaces:
removing the one or more inactive workspaces from the plurality of priority workspaces and adding the one or more inactive workspaces to the plurality of dormant workspaces; and
evicting cache data associated with the one or more inactive workspaces from a workspace cache associated with the group-based communication system.

7. The non-transitory computer-readable media of claim 1, the method further comprising:
uninstantiating a workspace of the plurality of priority workspaces; and
flushing at least a portion of a group-based communication cache associated with the workspace.

8. A method for progressively instantiating workspaces for a group-based communication system, the method comprising:
receiving, at a group-based communication server, via the group-based communication system, a request to load a plurality of workspaces, each workspace of the plurality of workspaces comprising one or more group-based communication channels and a plurality of associated content;
classifying, based on prior usage criteria, the plurality of workspaces into a plurality of priority workspaces and a plurality of dormant workspaces, wherein the plurality of dormant workspaces are different than the plurality of priority workspaces;
instantiating each of the plurality of priority workspaces in the group-based communication system;
transmitting, to the group-based communication system, real-time events associated with the plurality of priority workspaces without transmitting real-time events associated with the plurality of dormant workspace;
determining, based on a machine learning model, that a first dormant workspace of the plurality of dormant workspaces will be a priority workspace; and
in response to the determining:
instantiating the first dormant workspace; and
adding the first dormant workspace to the plurality of priority workspaces and removing the first dormant workspace from the plurality of dormant workspaces, such that real-time events associated with the first dormant workspace are transmitted to the group-based communication system.

9. The method of claim 8, the method further comprising:
detecting at the group-based communication server, a triggering real-time event associated with a triggered workspace of the plurality of dormant workspaces; and
in response to the detecting at the group-based communication server:
instantiating the triggered workspace; and
adding the triggered workspace to the plurality of priority workspaces and removing the triggered workspace from the plurality of dormant workspaces, such that real-time events associated with the triggered workspace are transmitted to the group-based communication system.

10. The method of claim 9, wherein the triggering real-time event comprises a message that mentions a group-based communication system user associated with the triggered workspace.

11. The method of claim 9, wherein the triggering real-time event comprises an advance triggering prediction based on a machine learning the machine learning model and recent workspace activity associated with the triggered workspace.

12. The method of claim 11, the determining is associated with a user interaction with a triggering event.

13. The method of claim 8, wherein the method further comprises:
monitoring workspace inactivity associated with each priority workspace of the plurality of priority workspaces to identify one or more inactive workspaces; and
in response to identifying the one or more inactive workspaces:
removing the one or more inactive workspaces from the plurality of priority workspaces and adding the one or more inactive workspaces to the plurality of dormant workspaces; and
evicting cache data associated with the one or more inactive workspaces from a workspace cache associated with the group-based communication system.

14. The method of claim 8, further comprising:
uninstantiating a workspace of the plurality of priority workspaces; and
flushing at least a portion of a group-based communication cache associated with the workspace.

15. A system comprising at least one processor and at least one non-transitory memory storing computer executable instructions that when executed by the at least one processor cause the system to carry out actions comprising:
receiving, at a group-based communication server, via a group-based communication system, a request to load a plurality of workspaces, each workspace of the plurality of workspaces comprising one or more group-based communication channels and a plurality of associated content;

classifying, based on prior usage criteria, the plurality of workspaces into a plurality of priority workspaces and a plurality of dormant workspaces, wherein the plurality of dormant workspaces are different than the plurality of priority workspaces;

instantiating each of the plurality of priority workspaces in the group-based communication system;

transmitting, to the group-based communication system, real-time events associated with the plurality of priority workspaces without transmitting real-time events associated with the plurality of dormant workspaces;

determining, based on a machine learning model, that a first dormant workspace of the plurality of dormant workspaces will be a priority workspace; and in response to the determining:
  instantiating the first dormant workspace; and
  adding the first dormant workspace to the plurality of priority workspaces and removing the first dormant workspace from the plurality of dormant workspaces, such that real-time events associated with the first dormant workspace are transmitted to the group-based system.

16. The system of claim 15, the actions further comprising:
  detecting at the group-based communication server, a triggering real-time event associated with a triggered workspace of the plurality of dormant workspaces; and
  in response to the detecting at the group-based communication server:
    instantiating the triggered workspace; and
    adding the triggered workspace to the plurality of priority workspaces and removing the triggered workspace from the plurality of dormant workspaces, such that real-time events associated with the triggered workspace are transmitted to the group-based communication system.

17. The system of claim 16, wherein the triggering real-time event comprises a message that mentions a group-based communication system user associated with the triggered workspace.

18. The system of claim 16, wherein the triggering real-time event comprises an advance triggering prediction based on the machine learning model and recent workspace activity associated with the triggered workspace.

19. The system of claim 18, wherein the determining is associated with a user interaction with a triggering event.

20. The system of claim 15, the actions further comprising:
  uninstantiating a workspace of the plurality of priority workspaces; and
  flushing at least a portion of a group-based communication cache associated with the workspace.

* * * * *